United States Patent [19]

Heinzl et al.

[11] 4,363,426

[45] Dec. 14, 1982

[54] DEVICE FOR CONVEYING AND DISPENSING LIQUID MEDIA

[75] Inventors: Alfred Heinzl; Heinz Stadler, both of Munich, Fed. Rep. of Germany

[73] Assignee: Siemens Aktiengesellschaft, Berlin & Munich, Fed. Rep. of Germany

[21] Appl. No.: 194,335

[22] Filed: Oct. 6, 1980

[30] Foreign Application Priority Data

Nov. 9, 1979 [DE] Fed. Rep. of Germany ....... 2945283

[51] Int. Cl.³ .......................... B67D 5/46; B67D 5/52
[52] U.S. Cl. .................................... 222/134; 222/376; 222/380; 417/511
[58] Field of Search ............... 222/134, 375, 376, 377, 222/378, 380, 385, 596; 417/511, 513

[56] References Cited

U.S. PATENT DOCUMENTS

| 2,325,262 | 7/1943 | McDannel et al. | 222/378 |
| 3,130,876 | 4/1964 | Baker | 222/385 X |
| 4,189,070 | 2/1980 | Macosko et al. | 222/134 |

FOREIGN PATENT DOCUMENTS

| 2711208 | 9/1978 | Fed. Rep. of Germany | 222/380 |
| 121878 | 6/1948 | Sweden | 222/378 |

Primary Examiner—F. J. Bartuska
Attorney, Agent, or Firm—Hill, Van Santen, Steadman, Chiara & Simpson

[57] ABSTRACT

A device for conveying and dispensing liquid media such as casting resin has at least one piston pump having a cylinder chamber which forms a seal for a piston therein which is connected via an input opening to a feed container for receiving a supply of liquid therefrom. The cylinder chamber has an output opening and the piston is tubular in form having wall perforations in the region of the input opening for admitting the liquid to the interior of the piston and has a valve at a discharging end thereof for exit of the liquid from the piston. A seal is thus formed by which the piston operates entirely surrounded by the liquid medium to be dispensed and external seals between the piston and the atmosphere are eliminated.

10 Claims, 2 Drawing Figures

DEVICE FOR CONVEYING AND DISPENSING LIQUID MEDIA

BACKGROUND OF THE INVENTION

1. Field of the Invention

The present invention relates to devices for conveying and dispensing liquid media such as casting resin, and in particular to such devices utilizing at least one piston pump having a cylinder chamber which forms a guide for the piston, and which is connected to a feed container and has an output for dispensing liquid from the feed container.

2. Description of the Prior Art

Various piston pumps are known in the art for dispensing liquid media, all of which have a piston seal serving as the piston guide which interfaces at one side with the atmosphere. Although it is possible to achieve a good seal by the use of, for example, elastic seals, such seals are easily attacked and destroyed by many types of liquid media which are to be conveyed and dispensed. This problem is particularly acute when the medium to be dispensed is casting resin to which fillers such as quartz sand and the like are added. Such fillers produce friction between the piston and the cylinder and thereby destroy the seals resulting in pump leaks and absorption of air.

SUMMARY OF THE INVENTION

It is an object of the present invention to provide a conveying and dispensing device for liquid media having at least one piston pump which facilitates a high degree of dispensing accuracy and which allows the conveying and dispensing of abrasive media without such media resulting in wear to the pump or sedimentation.

The above object is inventively achieved in a device wherein the piston is of a tubular formation and has perforations in its walls in the region of an input opening to the piston chamber through which liquid to be dispensed is admitted to the interior of the piston. The piston has a valve at a lower end thereof which can be opened and closed to control dispensing of the liquid.

The above-described dispensing device constructed in accordance with the principles of the present invention provides a piston pump wherein the medium to be conveyed is drawn through the wall openings of the piston into the interior of the piston where the medium is further drawn into the cylinder chamber by operation of the valve. The piston seal is located between the input opening and a lower free end of the piston in the cylinder chamber, so that the seal zone of the piston is comprised entirely of the medium which is to be conveyed. The pump thus possesses no outputs to the atmosphere which need be sealed by external seals, because the piston enters through the medium to be conveyed and dispensed. The pump thus operates without leaks and is unable to absorb air.

The cylinder is preferably extended to form an annular feed zone in the region of the inlet opening to the cylinder chamber. The medium to be conveyed thus flows into the feed zone from a feed container and is distributed around the piston so that it can flow uniformly from all sides through the wall perforations into the interior of the piston.

The valve at the lower end of the piston can be operated by means of a spring, however, a particularly suitable embodiment has a valve operated by a rod axially disposed in the interior of the piston. This results in a particularly high degree of dispensing accuracy. In order to avoid deposits on the inlet valve in the interior of the piston it is also preferable that in the rest state the inlet valve should be maintained permanently open by means of an actuating device. This allows any air bubbles which may form to rise in the liquid.

Moreover, the output opening of the piston chamber may be closed by means of a spring actuated outlet valve. In specific situations, such an outlet valve can be eliminated if the output opening is connected to a tube or nozzle having sufficient resistance to liquid flow.

As the piston moves in the medium which is to be conveyed and dispensed, an elastic seal is generally not required. In the case of extremely thin liquid media of very low viscosity an elastic seal can be provided to insure a high degree of dispensing accuracy, however, in such a case there is no danger of wear being caused by the medium to be conveyed inasmuch as such thin liquids will not be abrasive in nature. In most cases, however, such a seal will not be needed or used and a certain degree of slipping can be tolerated. In the case of the conveying and dispensing of abrasive media, such as for example, casting resins containing powdery fillers, it is preferable to select the gap between the piston and cylinder chamber to be greater than the granulation size of the filler contained in the medium to be conveyed. This prevents the piston and the piston seal from exerting friction on one another. Depending upon the viscosity of the medium to be conveyed, it is preferable to select the bearing length between the cylinder and piston to be such that the slippage which occurs does not impair the dispensing accuracy.

The piston axis is arranged vertically so that the channels run vertically in the cylinder chamber without being undercut. This avoids deposits of fillers in the pump. In addition, it is preferable that the wall perforations of the cylinder be beveled or rounded to facilitate flow of liquid therethrough.

The inventive concept herein can be expanded for use in a device having two or more pumps whose inputs are connected to separate feed containers and whose outputs lead to a common mixing device. In this manner, different substances can be dispensed in prescribed ratio and mixed with one another. For example, casting resin containing a filler may be supplied via one dispensing pump and a hardener may be supplied via a second dispensing pump, with the resin and hardener being mixed for processing in a post-connected mixing device. In such situations, it is preferable to actuate the pistons of the pumps via a common lifting device. The lifting device can also be utilized to achieve different piston strokes in the separate piston pumps in order to achieve a specific desired mixing ratio.

DESCRIPTION OF THE PREFERRED EMBODIMENTS

Figure 1:
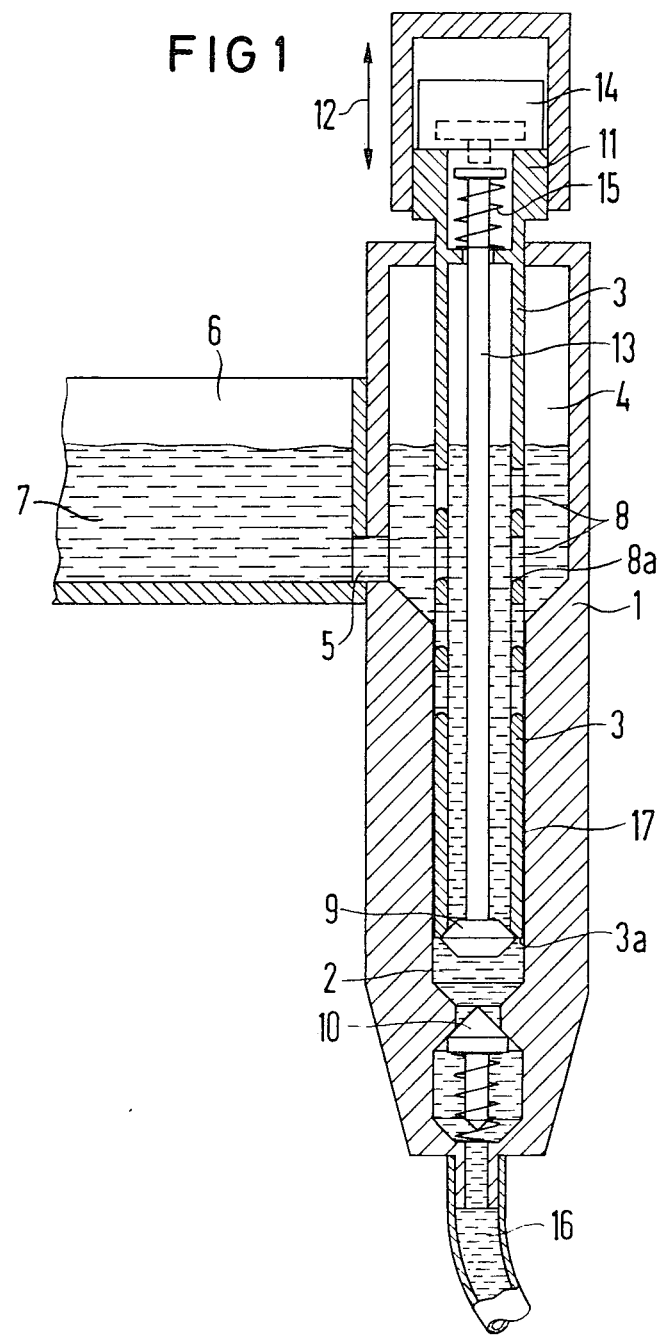
FIG. 1 is a cross sectional view of a piston pump constructed in accordance with the principles of the present invention for dispensing and conveying liquid media.

As shown in FIG. 1, a piston pump has a housing 1 having a cylinder chamber 2 in which a piston 3 is displaceably mounted. The cylinder chamber 2 widens at an upper portion thereof to form an annular feed zone 4 which is connected to a feed container 6 via an input opening 5. A liquid medium 7 which is to be conveyed and dispensed, which may, for example be casting resin, flows through the input opening 5 into the pump housing 1.

The piston 3 is tubular and in the region of the input opening 5 and the feed zone 4 has a plurality of wall perforations 8 through which the liquid medium to be conveyed flows and is admitted to the interior of the piston. At a lower portion of the piston 3 an end is closed by an inlet valve 9. When the valve 9 is opened, the liquid medium to be conveyed can flow out of the interior of the piston 3 into the cylinder chamber 2. The cylinder chamber may be provided with a spring-actuated outlet valve 10 for admitting the liquid to the exterior of the pump through a hose or other channel 16. The bias of the spring valve 10 is selected so as to dispense the liquid medium 7 in a pre-determined flow amount.

The piston 3 is moved in the direction of the double arrow 12 from the exterior by actuation of a piston head 11. The inlet valve 9 can be opened independently of the piston movement, however, by a valve rod 13 actuatable by an actuating device 14 which may, for example, be a compressed air cylinder. The actuating device 14 operates against a spring 15 which normally biases the valve 9 upwards and thus closes the piston 3 at its lower end.

In the rest state, the inlet valve 9 is open by the actuating device 14 so that no deposits form on the valve and air bubbles in the liquid 7 can rise. In order that suction may occur the piston 3 is moved upwards when the inlet valve 9 is open. The medium 7 to be conveyed is then drawn from the feed container 6 and the feed zone 4 through the wall perforations 8 into the piston 3 from where it is drawn through the valve opening at its lower end into the cylinder chamber 2. For the subsequent pumping procedure, the inlet valve 9 is initially closed. When the actuating device 14 is a compressed air cylinder, this is effected by venting the cylinder. This results in the valve rod 13 being drawn upwards against the bias of the spring 15. The piston 3 is then moved downwards thereby forcing the liquid medium 7 through the outlet valve 10 to the hose 16.

Because the piston 3 is constantly completely surrounded by the medium 7 to be conveyed in the region of a seal zone 17, the pump operates without leaks, and possesses no output to the atmosphere which must be sealed by other means. Any slippage which occurs in the region of the seal zone 17 and which is dependent upon the viscousity of the medium 7 to be conveyed can be kept sufficiently small so as to avoid impairment of the dispensing accuracy by selecting an appropriate varying length. When abrasive media are to be dispensed the seal zone 17 between the piston and cylinder is selected so as to be greater than the granulation size of the filler contained in the medium. This serves to avoid wear in the piston guide.

In order to avoid deposits, the pump is designed with a vertical axis so that no horizontal channels or undercuts, apart from the short input opening 5, exist. In the feed container 6, deposits can be avoided by means of an agitator as is known to those skilled in the art. The lower edges 8a of the wall perforations 8 may be rounded or beveled, thereby further preventing any fillers of the medium 7 to be conveyed becoming deposited around the openings 8.

Figure 2:
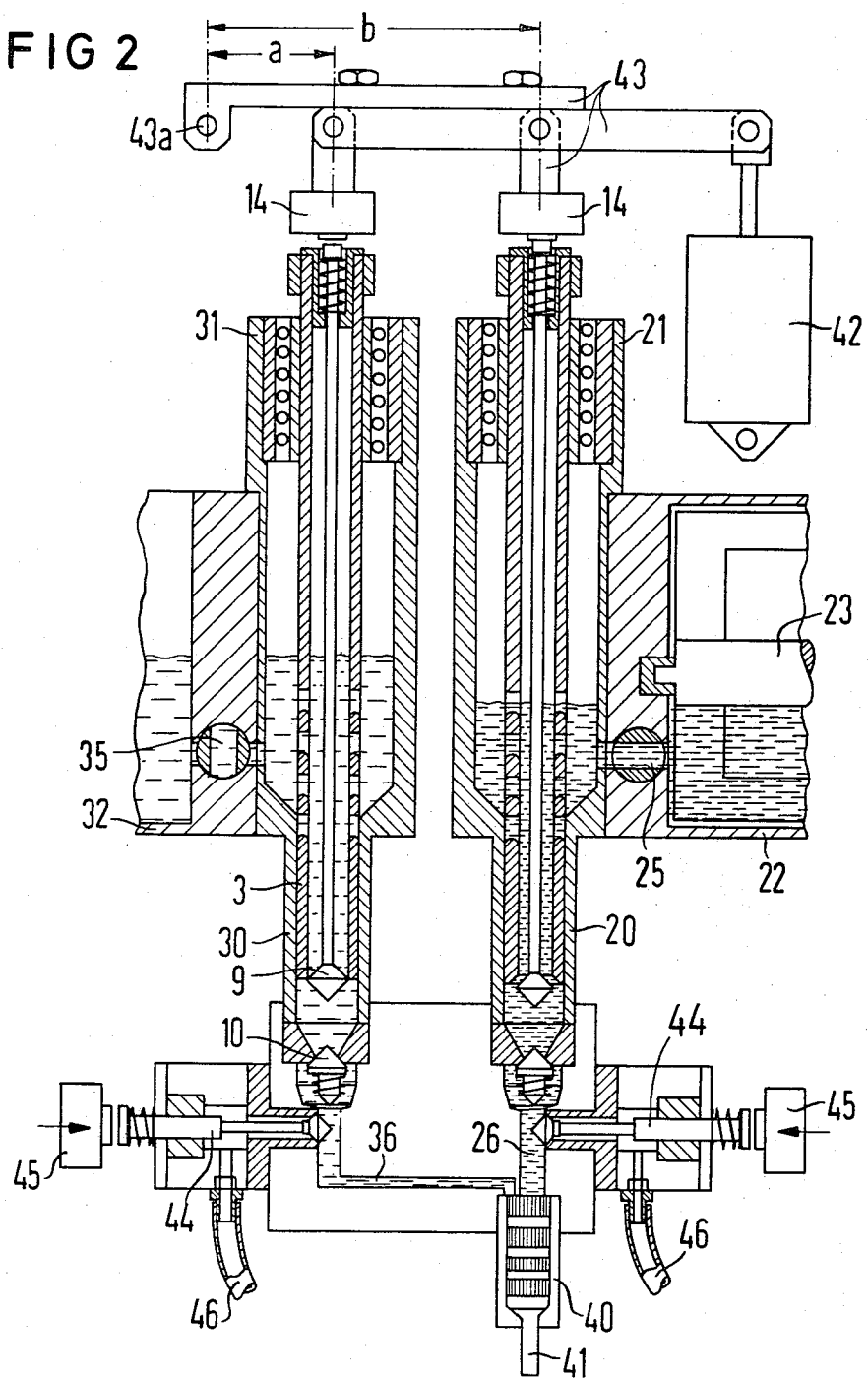
FIG. 2 is a dispensing device utilizing two or more pumps of the type disclosed in FIG. 1.

FIG. 2 illustrates the use of two pumps of the type described in FIG. 1 in a dispensing and mixing system. The pumps 20 and 30 are of substantially the same structure as shown in FIG. 1, each possessing a housing respectively designated at 21 and 31 and each having a piston 3 provided with an inlet valve 9 and an outlet valve 10 in each housing. The pump 20 is connected to a feed container 22 which contains, for example, a supply of casting resin containing powdered quartz as a filler. A horizontally arranged agitator 23 prevents demixing and sedimentation of the filler in the feed container. The casting resin is conveyed into the pump 20 through an input opening 25.

Similarly, the pump 30 is connected to a feed container 32 which may, for example, contain a hardener. The hardener is conveyed to the pump 30 via an input opening 35 and is dispensed thereby. The casting resin is conducted through the output 26 and the hardener is conducted through the output 36 to a postconnected mixer 40 in which the two media are mixed in a known manner and are subsequently further processed via a casting tube 41.

The mode of operation of the individual pumps 30 and 20 has already been described in connection with FIG. 1. In the mixing and dispensing device shown in FIG. 2, the two pumps are commonly actuated by a lifting cylinder 42 via a lever system 43. The lever system 43 pivots about a point 43a and the distances a and b respectively between the pivot point 43a and the pump 30 and the pump 20 determine the ratio of the piston strokes of the two pumps, and thus also determine the mixing ratio. As already explained in connection with FIG. 1, the inlet valves 9 can be actuated independently of the piston stroke via actuating devices 14.

The dispensing and mixing device can be cleaned by an additional cleaning device such as is shown in FIG. 2 which consists of flushing valves 44 which are opened by means of compressed air cylinders 45 whereupon a flushing liquid is forced via inputs 46 through the output channels 26 and 36 for each pump. Residues of the medium conveyed by each pump are thus pumped out of the mixing and dispensing device through the output 41 into a waste container.

Although modifications and changes may be suggested by those skilled in the art it is the intention of the inventors to embody within the patent warranted hereon all changes and modifications as reasonably and properly come within the scope of their contribution to the art.

We claim as our invention

1. A device for conveying and dispensing liquid media containing a granulated filler comprising at least one piston pump having a cylinder chamber and a tubular piston slidably received therein such that an annular gap exists between said cylinder chamber and said piston, said gap being larger than the average size of the particles of said granulated filler, said cylinder chamber having a widened upper portion forming an annular feed zone and having an input opening at a side thereof communicating with a feed container for receiving said liquid media from said feed container and having an output opening for dispensing said liquid media, said piston having a plurality of wall perforations in the region of said input opening for admitting said liquid media to the interior of said piston, and said piston further having an open lower end in the region of said output opening, and an inlet valve for opening and closing said lower end of said piston for admitting said liquid media from the interior of said piston to said output opening, whereby said piston is continuously completely surrounded by said liquid media and is sealed thereby.

2. The device of claim 1 wherein said inlet valve is actuated via a spring bias.

3. The device of claim 1 wherein said inlet valve is actuated by a valve rod extending axially through the interior of said piston.

4. The device of claim 3 further comprising an actuating device for maintaining said inlet valve in an open state when said pump is in a rest state.

5. The device of claim 1 wherein said output opening has a spring actuated outlet valve normally maintaining said output opening in a closed state and for permitting flow of said liquid media through said output opening in a pre-determined flow amount.

6. The device of claim 1 wherein said piston and cylinder have a bearing length which is a length along which said piston and said cylinder chamber are in frictional engagement, said bearing length being selected in dependence upon the frictional characteristics of the liquid for achieving a pre-determined amount of friction between said piston and cylinder chamber.

7. The device of claim 1 wherein said wall perforations have lower edges which are beveled for preventing accumulation of deposits of said liquid medium.

8. The device of claim 1 comprising at least two of said piston pumps which are disposed in parallel, each pump having an input opening which is connected to a separate feed container and each pump having an output opening connected to a common mixer device.

9. The device of claim 8 wherein the piston of each of said parallel pumps is actuated by a common lever device.

10. The device of claim 9 wherein said common lever device has a pivot point and wherein said pistons are actuated by said common lever device at respective distances from said pivot point for providing different piston strokes in each piston pump whereby a desired mixing ratio of the liquid in said separate feed containers is achieved.

* * * * *